Dec. 7, 1948.  E. P. WELLS  2,455,845
ROCKET
Filed May 22, 1944  2 Sheets-Sheet 1
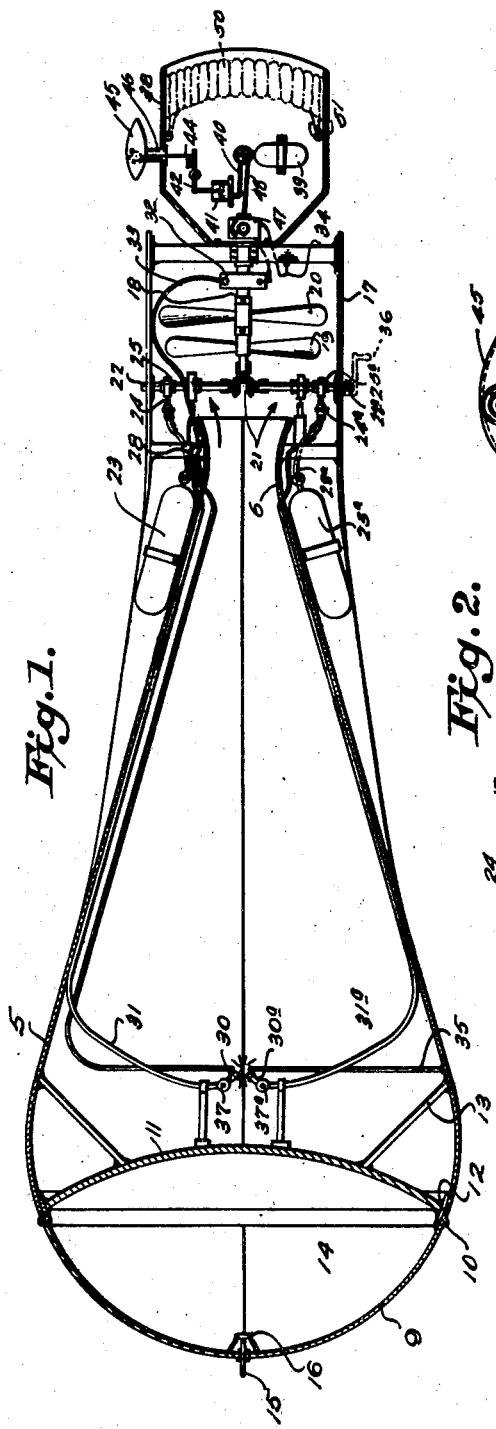
Inventor:
*Edward P. Wells,*
By *Clarence A. O'Brien
and Harvey B. Jacobson*
Attorneys Dec. 7, 1948. E. P. WELLS 2,455,845
ROCKET
Filed May 22, 1944 2 Sheets-Sheet 2
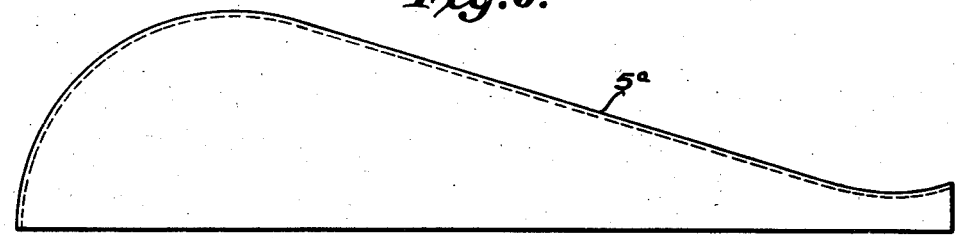
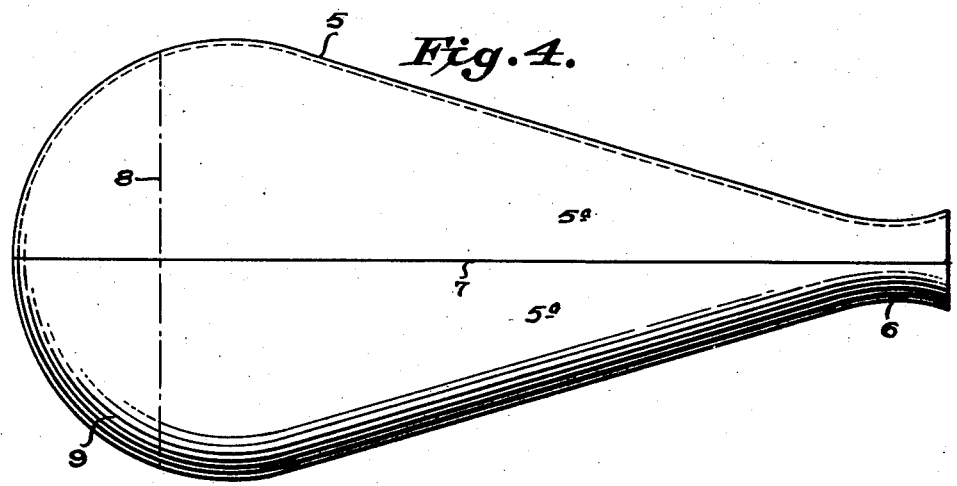
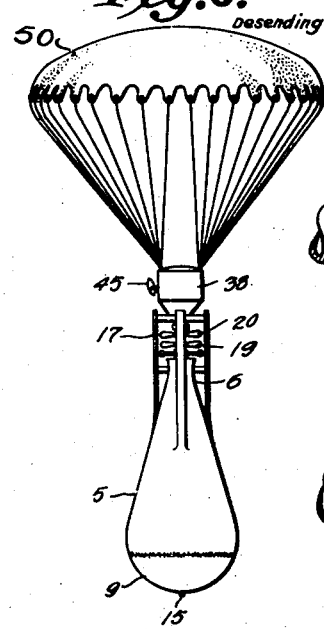
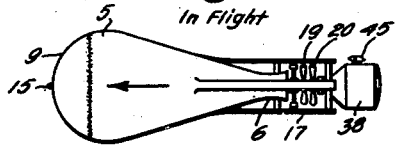
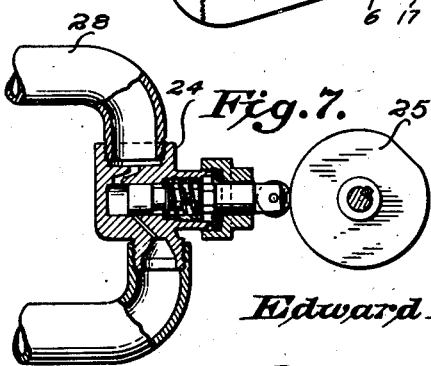
Inventor:
Edward P. Wells,
By Clarence A. O'Brien
and Harvey B. Jacobson
Attorneys.

Patented Dec. 7, 1948

2,455,845

UNITED STATES PATENT OFFICE 2,455,845

ROCKET

Edward P. Wells, Jacksonville, Fla.

Application May 22, 1944, Serial No. 536,783

4 Claims. (Cl. 102—49)

This invention relates to an improved rocket adapted to be propelled by the reaction of rearwardly discharging gases that result from intermittent combustion of fuel composed of hydrogen and oxygen gases, or the like.

The primary object of the present invention is to provide a simple and efficient rocket of the above kind that may be utilized as a propulsion means for vehicles, as a bomb, or as a carrier for supplies and the like.

An embodiment of the invention contemplates the provision of a rocket of the above kind which may be set to travel in a straight course for a predetermined length of time, and which embodies means to automatically alter the course of the rocket and to render its propulsion means inoperative when such predetermined time has elapsed, whereby the rocket may be caused to land approximately at a predetermined distant point.

A further object of the invention is to provide a rocket of the above kind including a parachute that will cause the rocket to descend at a slow rate of speed, the rocket having a hollow tail fin within which the parachute is normally stored in a folded condition, and means to automatically expel the folded parachute from the tail fin at the predetermined time when the course of the rocket is altered for descending and the propulsion means of the rocket is rendered inoperative.

With the above and other objects in view, the present invention consists in the novel form, combination and arrangement of parts hereinafter more fully described, shown in the accompanying drawings and claimed.

In the drawings, wherein like reference characters indicate corresponding parts throughout the several views:

Figure 1 is a substantially central longitudinal sectional view of a rocket constructed in accordance with the present invention.

Figure 2 is an enlarged fragmentary view of the rear portion of the rocket shown in Figure 1.

Figure 3 is an elevational view showing a longitudinal half-section of the rocket body and illustrating, in connection with Figure 4, a preferred manner of constructing the rocket body.

Figure 4 is an elevational view of the rocket body and showing the manner of assembling two longitudinal half-sections of the form shown in Figure 3 to construct the body.

Figure 5 is a side elevational view, drawn on a reduced scale, showing the complete rocket as it would appear in flight.

Figure 6 is an elevational view of the rocket, drawn on a reduced scale, and showing the rocket as it would appear in descending, the parachute being discharged from the tail fin of the rocket and in open condition.

Figure 7 is an enlarged fragmentary detail view, partly in section, showing one of the cam-operated valves employed for controlling the admission of the hydrogen and oxygen from their containing flasks to the pumps which supply the hydrogen and oxygen under pressure to the discharge nozzles where the combustion takes place.

Referring in detail to the drawings, the present rocket includes a hollow elongated body 5 of bulbous form and open at its rear smaller end, said body being constructed of a suitable strong sheet metal and formed so that its smaller rear end portion provides a discharge neck 6 of Venturitube formation. The body 5 is of such shape, therefore, that any longitudinal half-section thereof affords an air foil surface. Preferably, the body 5 is composed of two similar longitudinal half-sections 5a stamped and shaped from a sheet of metal and joined together, as by welding or the like, at 7 along their adjacent straight longitudinal edges. After assembly of the sections 5 and 5a, the forward end of the body is cut off along a line 8 at right angles to the longitudinal axis of the body so as to provide a removable nose portion 9 that is removably secured in place, as at 10, by any suitable means. Secured within the forward portion of the body 5 flush with the rear edge of the removable nose portion 9 is a partition 11 preferably of rearwardly curved concavo-spherical form. Partition 11 is preferably welded at its marginal edge to the inner surface of the rear or main portion of the body, as indicated at 12, and said partition may be suitably braced in place, as at 13. The partition 11 thus divides the body 5 into a main rear chamber within which the explosions are to take place in a manner to be later described, and a front compartment 14. The front compartment 14 may be utilized to carry supplies or mail, or it may receive an explosive in the event that the rocket is used as a bomb. In the latter case, the nose of the body will have an axial firing pin 15 adapted to fire a percussion cap 16 for exploding the explosive charge within the chamber 14 when said pin 15 contacts an object.

Rigidly fixed to and projecting rearwardly from the rear end portion of the body 5 coaxial with the latter is an open frame 17 within which is journaled a shaft 18 located coaxial with the longitudinal axis of the body 5. Fixed on and rotatable with the shaft 18 is a turbine 19, and freely rotatable on shaft 18 is a second rear propeller 20 whose blades are of a pitch opposite to that of the blades of propeller 19. The turbine 19 and propeller 20 act to stabilize the rocket longitudinally in flight, and the forward end of shaft 18 is operatively connected by gearing at 21 with the adjacent inner ends of aligned transverse shafts 22 and 22a.

Suitably secured to and against opposite sides of the smaller rear portion of body 5 are flasks 23 and 23a respectively containing different fuels, such as liquid hydrogen and liquid oxygen under high pressure. Suitably mounted in the frame 17 near the outer ends of the shafts 22 and 22a are spring-opened admission valves 24 and 24a that are closed by and intermittently allowed to open through the medium of controlling cams 25 and 25a respectively secured on the shafts 22 and 22a. Also suitably carried by the frame 17 are ejector pumps 26 and 26a actuated by cams 27 and 27a carried by the shafts 22 and 22a, respectively. The flask 23 has an outlet line 28 communicating with the inlet of valve 24, while the flash 23a has an outlet line 28a communicating with the inlet of valve 24a. The outlet of valve 24 connects at 29 with the intake of pump 26, and the outlet of valve 24a connects at 29a with the intake of pump 26a. Provided in rearwardly converging relation near the forward end of the main rear chamber of body 5 are discharge nozzles 30 and 30a provided respectively on the forward ends of lines 31 and 31a leading respectively from the discharge ports of pumps 26 and 26a. Mounted in operative relation to the shaft 18 is a magneto electric generator unit 32, one terminal of which connects with an end of an ignition wire 33 whose other end terminates adjacent the nozzles 30 and 30a. The other side of the unit 32 is grounded at 34 to the frame 17, while a further conductor 35 has one end grounded to the body 5 and its other end disposed adjacent to but slightly spaced from the forward end of conductor 33. Thus, a spark gap is provided between the adjacent forward ends of conductor 33 and conductor 35. An end of shaft 22a may be adapted for reception of a starting crank indicated by dotted lines at 36.

In operation, crank 36 is operated so as to turn shafts 22a, 22 and 18. At regular intervals, the valves 24 and 24a respectively admit the hydrogen and oxygen to the pumps 26 and 26a. The pumps force the hydrogen and oxygen through expansion valves 37 and 37a of nozzles 30 and 30a, and at the proper intervals the unit 32 supplies current for producing a spark at the gap between the conductors 33 and 35, thereby exploding the mixture of hydrogen and oxygen gas issuing from and combining in front of the nozzles 30 and 30a. These rapid intermittent explosions produce expanding gases of combustion which rush rearwardly through the rear end of the body and attain a high velocity at the Venturi neck portion 6. The reaction of these gases against the partition 11 causes forward propulsion of the rocket, and as the gases discharge from the rear end of the body, they impinge the turbine 19 and propeller 20 so as to rotate the latter in opposite directions. The rotation of turbine 19 effects actuation of the unit 32, valves 24 and 24a, and pumps 26 and 26a, so that propulsion of the rocket will continue as long as fuel remains in the flasks 23 and 23a, unless the propulsion means is intentionally rendered inoperative.

Secured to the rear end of the frame 17 is a flat vertical and hollow tail fin 38 that is open at its rear end. Suitably mounted in the fin 38 is a small flask 39 containing a quantity of carbon dioxide gas. The flask 39 has an outlet line 40 provided with a suitable control valve and communicating with the cylinder of a fluid pressure motor 41. The piston of motor 41 is connected with one end of a lever 42 which is pivoted at 43 intermediate its ends within the tail fin 38. The other end of lever 42 is operatively connected at 44 with the shaft of a rocking course deflecting rudder or elevator 45 pivotally carried by a hollow standard 46 secured on top of the fin 38. The arrangement is such that the course deflector 45 may be set in a position as shown to keep the rocket on a straight course, but the course deflector 45 may be operated to cause the rocket to change its course and nose downwardly for descending. Mounted in the forward portion of fin 38 is a conventional timing device 47 having a switch mechanism interposed in the ignition circuit of unit 32. Also, the timing device 47 is operatively connected at 48 with the control valve of line 40. The arrangement is such that the device 47 may be set to operate at a predetermined time so as to open the ignition circuit and render the propulsion means of the rocket inoperative. Also, the timing device simultaneously opens the control valve of line 40 so as to admit the carbon dioxide gas under pressure from flask 39 to the cylinder of motor 41, thereby actuating the course deflector 45 in a manner to cause the rocket to nose downwardly. In this way, the rocket may be caused to travel for a predetermined distance and then descend to the ground approximately at a predetermined point, the speed of travel of the rocket being known.

As shown clearly in Figures 2, the cylinder of motor 41 is provided with perforations at 49 adapted to be uncovered as the piston of said motor 41 approaches its outward or upward limit of movement. In this way, the carbon dioxide gas under pressure is allowed to discharge from the cylinder of motor 41 and fill the greater portion of the tail fin 38. Normally stored in a folded condition within the rear portion of fin 38 is a parachute 50, and the carbon dioxide gas discharged into the fin 38 has sufficient pressure to expel the parachute from the fin 38 so that it may open and cause the rocket to descend slowly after the course of the rock has been deflected and the propulsion means of the rocket has been rendered inoperative. The cords of the parachute 50 are suitably anchored at 51 to and within the fin 38. Of course, the parachute 50 is only utilized when the rocket is used for carrying supplies or mail, there being no need for the fin 38 or the parachute when the rocket is employed as a propulsion means for vehicles or as a bomb.

From the foregoing description, it is believed that the construction and operation, as well as the advantages of the present invention, will be readily understood and appreciated by those skilled in the art. It is apparent that the invention is susceptible of modification and changes in details of construction illustrated and described, such as fairly fall within the spirit and scope of the invention as claimed.

What I claim is:

1. In a jet-propelled rocket, a hollow elongated body including a rearwardly tapering major intermediate portion defining a combustion chamber and a rear gas discharge neck of venturi-tube formation merging and co-axial with said intermediate portion, flasks of different highly compressed liquid fuels secured on the outside of said body adjacent said discharge neck, discharge nozzles mounted centrally of the forward end of said combustion chamber, means including pumps and admission valves therefor mounted directly at the rear of said body for intermittently supplying fuel from said flasks to said nozzles, electrical means for igniting the fuels issuing from sad nozzles, an electric generator mounted at the rear of said body for supplying current to said igniting means, a turbine arranged to be driven by gasses issuing from said discharge neck, and driving connections between said turbine and the pumps, the admission valves and the generator.

2. The construction defined in claim 1, in combination with a timing device to render the igniting means inoperative at a predetermined time.

3. The construction defined in claim 1, in combination with a timing device to render the igniting means inoperative at a predetermined time, a course deflector, operating means for said course deflector, a control element for said operating means, and means operatively connecting said timing device to said control element so as to cause the rocket to change its course at a predetermined time.

4. The construction defined in claim 1, in combination with a timing device to render the igniting means inoperative at a predetermined time, a course deflector, operating means for said course deflector, a control element for said operating means, means operatively connecting said timing device to said control element so as to cause the rocket to change its course at a predetermined time, a tail fin on the rocket open at its rear end, and a parachute stored in said fin, said operating means including a fluid pressure motor for actuating the course deflector and adapted to discharge fluid under pressure into the fin after the igniting means is rendered inoperative and after actuation of said course deflector for expelling the parachute from the fin.

EDWARD P. WELLS.

REFERENCES CITED

The following references are of record in the file of this patent:

UNITED STATES PATENTS

| Number | Name | Date |
|---|---|---|
| 976,732 | Gherassimoff | Nov. 22, 1910 |
| 1,103,503 | Goddard | July 14, 1914 |
| 1,670,641 | Sperry | May 22, 1928 |
| 1,897,092 | Weir | Feb. 14, 1933 |
| 2,145,507 | Denoix | Jan. 31, 1939 |
| 2,283,863 | Achterman | May 19, 1942 |
| 2,343,074 | Murray et al. | Feb. 29, 1944 |

FOREIGN PATENTS

| Number | Country | Date |
|---|---|---|
| 379,664 | Italy | Apr. 2, 1940 |
| 534,801 | France | Jan. 13, 1922 |
| 811,712 | France | Jan. 23, 1937 |